United States Patent
Rouleau et al.

(10) Patent No.: US 6,548,040 B1
(45) Date of Patent: Apr. 15, 2003

(54) PROCESS FOR PREPARING A ZEOLITE WITH STRUCTURE TYPE MTT USING SPECIFIC TEMPLATE PRECURSORS

(75) Inventors: Loïc Rouleau, Oullins (FR); Frédéric Kolenda, Francheville le Haut (FR); Eric Benazzi, Chatou (FR)

(73) Assignee: Institut Francais du Petrole (FR)

( * ) Notice: Subject to any disclaimer, the term of this patent is extended or adjusted under 35 U.S.C. 154(b) by 294 days.

(21) Appl. No.: 09/672,053

(22) Filed: Sep. 29, 2000

(30) Foreign Application Priority Data

Sep. 29, 1999 (FR) .............................. 99 12268

(51) Int. Cl.⁷ ........................... C01B 39/48; C07C 5/13
(52) U.S. Cl. ............ 423/705; 423/708; 423/DIG. 36; 208/134; 208/135; 585/739; 585/750
(58) Field of Search ................. 423/705, 708, 423/DIG. 36; 502/60, 74, 66; 208/134, 135; 585/739, 750

(56) References Cited

U.S. PATENT DOCUMENTS

| 4,490,342 A | * | 12/1984 | Valyocsik | .................. | 423/708 |
| 4,531,012 A | * | 7/1985 | Valyocsik | .................. | 423/708 |
| 4,619,820 A | * | 10/1986 | Valyocsik | .................. | 423/332 |
| 5,707,601 A | * | 1/1998 | Nakagawa | .................. | 423/701 |
| 6,337,063 B1 | * | 1/2002 | Rouleau et al. | .............. | 423/705 |

FOREIGN PATENT DOCUMENTS

| EP | 0 042 226 A1 | 12/1981 |
| EP | 0 125 978 A2 | 11/1984 |
| EP | 0 214 371 A1 | 3/1987 |
| GB | 2 202 838 A | 10/1988 |

* cited by examiner

*Primary Examiner*—David Sample
(74) *Attorney, Agent, or Firm*—Millen, White, Zelano & Branigan, P.C.

(57) ABSTRACT

The present invention concerns a process for synthesising a zeolite with structure type MTT comprising at least one element X selected from silicon and germanium and at least one element T selected from aluminium, iron gallium, boron, titanium, vanadium, zirconium, molybdenum, arsenic, antimony, chromium and manganese, comprising reacting an aqueous mixture comprising at least one source of at least one element X, at least one source of at least one element T, and at least one precursor of an organic compound comprising at least one alkylated polymethylene α-ω diammonium derivative, characterized in that at least one precursor is selected from monoamines. The present invention also concerns the use of the zeolite obtained as a catalyst in a process for converting hydrocarbon-containing feeds, as an adsorbent to control pollution and as a molecular sieve for separation.

21 Claims, No Drawings

PROCESS FOR PREPARING A ZEOLITE WITH STRUCTURE TYPE MTT USING SPECIFIC TEMPLATE PRECURSORS

TECHNICAL FIELD

The present invention relates to a novel process for preparing zeolites with structure type MTT. More particularly, for example, this process is applicable to synthesising ZSM-23 zeolite. ZSM-23 zeolite generally HAS the following formula in the anhydrous form: 0-20 $R_2O$: 0-10 $T_2O_3$: 100$XO_2$ where R represents a monovalent cation or 1/n of a cation with valency n, T represents at least one element selected from aluminium, iron, gallium, boron, titanium, vanadium, zirconium, molybdenum, arsenic, antimony, chromium and manganese, and X represents silicon and/or germanium.

Zeolites with structure type MTT such as ZSM-23 zeolite are generally synthesised by mixing, in an aqueous medium, at least one source of silica and/or germanium and at least one source of at least one element selected from aluminium, iron, gallium, boron, titanium, vanadium, zirconium, molybdenum, arsenic, antimony, chromium and manganese in the presence of at least one organic template such as a quaternary diammonium compound. The mixture is generally maintained at a certain temperature until the zeolite crystallises.

PRIOR ART

ZSM-23 zeolite with structure type MTT, which has already been described in the prior art, has a unidimensional microporous framework, with a pore diameter of 4.5×5.2 Å (1 Å=1Angström=1×10$^{-10}$m) ("Atlas of Zeolite Structure Types", W. M. Meier and D. H. Olson, 4$^{th}$ edition, 1996). Further, A. C. Rohmann et al (Zeolites, 5, 352, 1985), J. L. Schenker et al (private communication, 1992) and B. Marler et al (J. Appl. Cryst. 26; 636, 1993) have stated that the crystalline lattice has orthorhombic symmetry (Pmn2$_1$, a=21.5 Å, b=11.1 Å, c=5.0 Å) with channels parallel to axis c, delimited by rings of 10 tetrahedra. The synthesis mode and physico-chemical characteristics of ZSM-23 zeolite have been described in a variety of patents which differ in the nature of the organic template used. That zeolite can be synthesised using pyrrolidine (United States patent U.S. Pat. No. 4,076,842), diisopropanolamine (British patent GB-A-2 190 910), quaternary ammonium compounds such as heptamethonium bromide (U.S. Pat No. 4,490,342), dodecamethonium bromide (GB-A-2 202 838), dodecamethonium bromide (U.S. Pat. No. 5,405,596) and quaternary triammonium compounds (U.S. Pat. No. 5,332,566). The mode of synthesis comprises mixing an oxide, generally a silicon oxide, and an oxide, generally an aluminium oxide, in the presence of an organic template.

Other zeolites have structure type MTT and differ from ZSM-23 zeolite in the mode of preparation, in particular in the organic template used. These are EU-13 zeolite (European patent EP-A-0 108 486), using a quaternary methylated ammonium or phosphonium salt, ISI-4 zeolite (EP-A-0 102 497) using ethylene glycol or a monoethanolamine, SSZ-32 zeolite (U.S. Pat No. 4,483, 835) using imidazole derivatives or KZ-1 zeolite using a variety of amines (L. M. Parker et al., Zeolites, 3, 8, 1988).

SUMMARY OF THE INVENTION

The present invention concerns a novel process for preparing a zeolitic material with structure type MTT in the presence of at least one precursor of an alkylated polymethylene α-ω diammonium derivative acting as a template selected from monoamines.

IMPORTANCE OF THE INVENTION

The process of the invention can reduce the zeolite crystallisation time after forming the mixture, which reduces the costs. Further, the use of precursors of the template of the invention improves safety when synthesising the zeolite, said precursors being less dangerous than the template itself, and can also reduce the cost of the reactants, said precursors being cheaper than the template itself and than prior art precursors.

Thus, surprisingly, the Applicant has discovered that synthesis of a zeolite characterized by using specific precursors of the template can produce the advantages cited above, i.e., an advantage as regards time, safety and reactant costs.

DESCRIPTION OF THE INVENTION

The invention concerns a process for synthesising a zeolite material with structure type MTT comprising mixing, in an aqueous medium, at least one source of at least one element selected from silicon and germanium and at least one source of at least one element T selected from aluminium, iron, gallium, boron, titanium, vanadium, zirconium, molybdenum, arsenic, antimony, chromium and manganese, in the presence of at least one precursor of an alkylated polymethylene α-ω diammonium derivative acting as a template. The mixture is generally maintained at a certain temperature until the zeolite crystallises. The invention is characterized in that at least one precursor of the alkylated polymethylene α-ω diammonium derivative selected from monoamines is used.

The alkylated polymethylene α-ω diammonium derivative acting as a template has the following formula:

where n is in the range 3 to 14 and $R_1$ to $R_6$, which may be identical or different, can represent alkyl or hydroxyalkyl radicals containing 1 to 8 carbon atoms; up to five $R_1$ to $R_6$ radicals can be hydrogen.

In addition to the precursor(s) of the template selected from monoamines in the process of the present invention, other template group(s) are generally introduced using any suitable precursor to obtain a quaternary ammonium compound. These precursors are of F-R-F' type where F and F' are identical or different starting groups such as an alcohol function or a halide. As an example, an additional precursor can be selected which is at least one compound selected from alkanediols and alkane dihalides.

The precursors of the template of the invention and the other precursors can be pre-heated together in the reaction vessel or they can be mixed as they are with the other reactants. The precursors can be introduced at any moment of the zeolite preparation.

Preferably, the template precursors are introduced in solution before adding the other reactants necessary, to synthesise the zeolite.

In one particular implementation, it may be advantageous to add seeds S of at least one zeolite to the reaction medium. Seeds with the MTT zeolite structure type or the structure type of other accessible and cheap zeolites such as zeolites with structure type LTA, FAU, MOR or MFI can be added. These seeds can accelerate crystallisation of the MTT zeolite from the reaction mixture. The seeds can be introduced at any point of the zeolite synthesis. Preferably, in the optional case where the MTT zeolite is synthesised using seeds, said seeds are added after at least partial homogenisation of the mixture containing the other reactants.

In a further particular implementation, independent or otherwise of the preceding implementation, it may be advantageous to add at least one alkali metal or ammonium salt P to the reaction medium. Examples which can be cited are strong acid radicals such as bromide, chloride, iodide, sulphate, phosphate or nitrate, or weak acid radicals such as organic acid radicals, for example citrate or acetate. This salt can accelerate crystallisation of MTT zeolites from the reaction mixture.

The aqueous reaction mixture generally has the following molar composition, expressed in the oxide form:

| | |
|---|---|
| $XO_2/T_2O_3$ (mol/mol) | at least 10 |
| $OH^-/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0 to 0.1 |

Preferably, the reaction mixture has the following composition, expressed in the oxide form:

| | |
|---|---|
| $XO_2/T_2O_3$ (mol/mol) | at least 12 |
| $OH^-/XO_2$ (mol/mol) | 0.005 to 15 |
| $Q/XO_2$ (mol/mol) | 0.005 to 15 |
| $Q/(M^+ + Q)$ (mol/mol) | 0.1 to 1.0 |
| $H_2O/XO_2$ (mol/mol) | 3 to 250 |
| $P/XO_2$ (mol/mol) | 0 to 1 |
| $S/XO_2$ (g/g) | 0 to 0.07 | and still more preferably, the reaction mixture has the following composition, expressed in the oxide form:

| | |
|---|---|
| $XO_2/T_2O_3$ (mol/mol) | at least 15 |
| $OH^-/XO_2$ (mol/mol) | 0.01 to 1 |
| $Q/XO_2$ (mol/mol) | 0.01 to 1 |
| $Q/(M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0 to 0.04 | where X is silicon and/or germanium,

T is at least one element selected from aluminium, iron, gallium, boron, titanium, vanadium, zirconium, molybdenum, arsenic, antimony, chromium and manganese $M^+$ represents an alkali metal or an ammonium ion;

Q represents the alkylated polymethylene α-ω diammonium derivative cited above, introduced by means of the corresponding appropriate precursors, containing a monoamine;

S represents zeolite seeds expressed in their dried, calcined or exchanged form;

P represents the alkali metal or ammonium salt.

M and/or Q can be present in the form of hydroxides or salts of inorganic or organic acids provided that the $OH^-/XO_2$ criterion is satisfied.

The invention is characterized in that the organic template comprising an alkylated polymethylene α-ω diammonium derivative is introduced using at least one precursor selected from monoamines. The term "monoamine" means any organic compound with an amine function. Preferably, the precursors of the invention are selected from alkylamines containing 1 to 18 carbon atoms per molecule, preferably containing 1 to 8 carbon atoms per molecule. The alkylamines can be primary, secondary or tertiary. More particularly, the precursors are selected from trialkylamines.

Preferred starting alkylated polymethylene α-ω diammonium derivatives Q are, inter alia, alkylated heptamethylenediammonium, octamethylenediammonium, undecamethylenediammonium or dodecamethylenediammonium and especially methylated heptamethylenediammonium, octamethylenediammonium, undecamethylenediammonium or dodecamethylenediammonium derivatives, more preferably still 1,7-N,N,N,N',N',N',-hexamethylhexamethylenediannmonium salts, 1,8-N,N,N,N',N',N',-hexamethyloctamethylene α-ω diammonium salts, 1,11-N,N,N,N',N',N',-hexamethylundecamethylene α-ω) diammonium salts, 1,12-N,N,N,N',N',N',-hexamethyldodecamethylene α-ω diammonium salts with formula $(CH_3)_3N^+ (CH_2)_n N^+ (CH_3)_3$, n=7, 8, 11 or 12, for example the halide, hydroxide, sulphate, silicate or aluminate. Preferably, for example, the precursor of the invention selected from monoamines is the trimethylamine and the other precursor is dibromoheptane, dibromooctane, dibromoundecane or dibromododecane.

The preferred alkali metal ($M^+$) is sodium. The preferred element T is aluminium. The preferred element X is silicon.

The silicon source can be any one in normal use envisaged for zeolite synthesis, for example solid powdered silica, silicic acid, colloidal silica or dissolved silica. Powdered silicas which can be used include precipitated silicas, in particular those obtained by precipitation from a solution of an alkali metal silicate such as Zeosil or Tixosil produced by Rhône-Poulenc, fumed silicas such as aerosil produced by Degussa and Cabosil produced by Cabot, and silica gels. Colloidal silicas with a variety of granulometries can be used, such as those sold under trade marks "LUDOX" from Dupont, and "SYTON" from Monsanto.

Particular dissolved silicas which can be used are commercially available soluble glasses or silicates containing: 0.5 to 6.0 and in particular 2.0 to 4.0 moles of $SiO_2$ per mole of alkali metal oxide and silicates obtained by dissolving silica in an alkali metal hydroxide, a quaternary ammonium hydroxide or a mixture thereof.

More advantageously, the aluminium source is sodium aluminate, but it can be aluminium, an aluminium salt, for example a chloride, nitrate or sulphate, an aluminium alcoholate or alumina itself which should preferably be in a hydrated or hydratable form, such as colloidal alumina, pseudoboehmite, boehmite, gamma alumina or a trihydrate.

Mixtures of the sources cited above can be used. Combined sources of silicon and aluminium can also be used, such as amorphous silica-aluminas or certain clays.

The reaction mixture is normally caused to react under autogenous pressure, optionally adding a gas, for (example nitrogen, at a temperature in the range 85° C. to 250° C. until zeolite crystals form, which can take from 1 minute to several months depending on the reactant composition, the mode of heating and the mixture, the working temperature and the degree of stirring. Stirring is optional but preferable, as it reduces the reaction time.

When the reaction is over, the solid phase is collected on a filter and washed and is then ready for subsequent operations such as drying, calcining and ion exchange.

To obtain the hydrogen form of the MTT zeolite, ion exchange can be carried out using an acid, in particular a strong mineral acid such as hydrochloric, sulphuric or nitric acid, or with an ammonium compound such as ammonium chloride, sulphate or nitrate. Ion exchange can be carried out by diluting once or more with the ion exchange solution. The MTT zeolite can be calcined before or after ion exchange or between two ion exchange steps, preferably before ion exchange to eliminate all absorbed organic substances, provided that ion exchange is thereby facilitated.

As a general rule, the cation or cations of the MTT zeolite can be replaced by one or more cations of any metal, in particular those from groups IA, IB, IIA, IIB, IIIA and IIIB (including the rare earths), VIII (including the noble metals), also lead, tin and bismuth (the periodic table is that shown in the "Handbook of Physics and Chemistry", $76^{th}$ edition). Exchange is carried out using any water-soluble salt containing the appropriate cation.

The present invention also concerns the use of the MTT zeolite prepared using the process of the present invention as an adsorbent to control pollution, as a molecular sieve for separation and as an acidic solid for catalysis in the fields of refining and petrochemistry.

As an example, when it is used as a catalyst, the MTT zeolite synthesised using the process of the present invention can be associated with an inorganic matrix which can be inert or catalytically active, and with an active phase. The inorganic matrix can be present simply as a binder to keep the small particles of zeolite together in the different known forms of catalysts (extrudates, beads, powders), or it can be added as a diluent to impose a degree of conversion on a process which would otherwise proceed at too high a rate leading to clogging of the catalyst as a result of increased coke formation. Typical inorganic diluents are support materials for catalysts such as silica, the different forms of alumina and kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds.

The zeolite with structure type MTT can also be associated with at least one other zeolite and acts as the principal active phase or as an additive.

The inorganic matrix can be a mixture of different compounds, in particular an inert phase and an inorganic phase.

The metallic phase is introduced into the zeolite alone, the inorganic matrix alone or into the inorganic matrix-zeolite ensemble, by ion exchange or impregnation with cations or oxides selected from the following: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

Catalytic compositions comprising the zeolite with structure type MTT can be applied to isomerisation, transalkylation and dismutation, alkylation and dealkylation, hydration and dehydration, oligomerisation and polymerisation, cyclisation, aromatisation, cracking and hydrocracking, hydrogenation and dehydrogenation, reforming, oxidation, halogenation, amine synthesis, hydrodesulphurisation and hydrodenitrogenation, catalytic elimination of oxides of nitrogen, ether formation and hydrocarbon conversion and to the synthesis of organic compounds in general, these reactions involving saturated and unsaturated aliphatic hydrocarbons, aromatic hydrocarbons, oxygen-containing organic compounds and organic compounds containing nitrogen and/or sulphur, also organic compounds containing other functional groups.

More particularly, the invention concerns the use of a zeolite with structure type MTT as a catalyst for isomerising straight chain paraffins containing 4 to 8 carbon atoms.

Isomerisation (hydroisomerisation) of straight chain paraffins containing 4 to 8 carbon atoms per molecule can be carried out with bifunctional catalysts, combining an acidic function with a hydrodehydrogenating function.

The catalyst of the invention comprising at least one zeolite with structure type MTT can be used in any process for isomerisation (or hydroisomerisation) of $C_5$–$C_{10}$ paraffins, preferably $C_7$–$C_{10}$, more preferably $C_7$–$C_9$ and still more preferably $C_7$–$C_8$. The catalyst of the invention is particularly suitable for a process for preparing gasoline with a high octane number, combining catalytic isomerisation and separation. More particularly, it is suitable for the process described in French patent application FR 97/14891, which comprises an isomerisation section and at least one section for separating dibranched and tribranched paraffins.

The MTT zeolite based catalyst of the invention contains at least one matrix in an amount in the range 1% to 90%, preferably in the range 5% to 90%, more preferably in the range 10% to 85%.

Non limiting examples of matrices used to form the catalyst are alumina gel, alumina, magnesia, amorphous silica-alumina, and mixtures thereof. Techniques such as extrusion, pelletisation or bowl granulation can be employed to carry out the forming operation.

The catalyst also includes a hydrodehydrogenating function ensured, for example, by at least one element from group VIII, preferably at least one element selected from the group formed by platinum and palladium. The quantity of non noble group VIII metal with respect to the final catalyst is in the range 1% to 40% by weight, preferably in the range 10% to 30%. In this case, the non noble metal is usually associated with at least one group VIB metal (preferably Mo or W). If at least one noble group VIH metal is used, the quantity used with respect to the final catalyst is less than 5% by weight, preferably less than 3% by weight, more preferably less than 15%.

When using noble group VIII metals, the platinum and/or palladium are preferably localised on the matrix, defined as above.

Isomerisation (hydroisomerisation) is carried out in at least one reactor. The temperature is in the range 150° C. to 350° C., preferably in the range 200° C. to 300° C., and the partial pressure of hydrogen is in the range 0.1 to 7 MPa, preferably in the range 0.5 to 5 MPa. The space velocity is in the range 0.2 to 10 liters of liquid hydrocarbons per liter of catalyst per hour, preferably in the range 0.5 to 5 liters of liquid hydrocarbons per liter of catalyst per hour. The hydrogen/feed mole ratio at the reactor inlet is such that the hydrogen/feed mole ratio in the effluent leaving the reactor is generally more than 0.01, preferably in the range 0.01 to 50, more preferably in the range 0.06 to 20.

The invention will now be illustrated by the following examples.

EXAMPLES 1 TO 4 (comparative)

Synthesis of ZSM-23 zeolite with a variable Si/Al ratio of more than 18 with octamethonium bromide (1,8-hexamethyloctamethylenediammonium bromide) as the organic template. The synthesis mixture had the following molar composition:

| Example | 1<br>Si/Al = 20 | 2<br>Si/Al = 20 | 3<br>Si/Al = 20 | 4<br>Si/Al = 100 |
|---|---|---|---|---|
| SiO2 (mol) | 60 | 60 | 60 | 60 |
| Al2O3 (mol) | 1.5 | 1.5 | 1.5 | 0.3 |
| Na2O (mol) | 9 | 9 | 9 | 5 |
| OctaBr2 (mol) | 10 | 10 | 10 | 10 |
| H2O (mol) | 3000 | 3000 | 3000 | 3000 |
| ZSM-23/SiO2 (g/g) | 0 | 0.04 | 0 | 0 |

OctaBr2 = octamethonium bromide = $Me_3N(CH_2)_8N\ Me_3^{2+}(Br^-)_2$

A solution A composed of silica and template was prepared by diluting the octamethonium bromide in 80% of the water necessary to form the gel then adding the colloidal silica sol (Ludox HS40, Dupont, 40% $SiO_2$). Solid sodium hydroxide (Prolabo, 99%) and solid sodium aluminate (Prolabo, 46% $Al_2O_3$, 33% $Na_2O$) were then dissolved in 10% of the water necessary to form the gel to form a solution B. Solution B was added to solution A with stirring, then the remaining water (10%). Mixing was carried out until the medium was homogeneous and seeds of dried MTT zeolite were added. The resulting mixture was reacted in a 125 ml autoclave with stirring at 180° C. under autogenous pressure until the zeolite crystallised. After cooling, the product was filtered and washed with 0.5 liters of demineralised water then dried in a ventilated oven at 120° C.

The results of X ray diffraction and chemical analysis are shown in following table, along with the crystallisation conditions.

| Example | 1<br>Si/Al = 20 | 2<br>Si/Al = 20 | 3<br>Si/Al = 20 | 4<br>Si/Al = 100 |
|---|---|---|---|---|
| Temperature (° C.) | 180 | 180 | 180 | 180 |
| Time (days) | 10.1 | 8.2 | 11.8 | 8.4 |
| ZSM-23 (%, XRD) | 100 | 98 | 85 (+ 15% Q) | 102 |
| Si/Al (mol/mol, XF) | 18.5 | 19.2 | nd | 97 |
| Yield (%) | 4.9 | 4.7 | 4.8 | 4.8 |

Q: quartz
XRD: X ray diffraction with Example 1 as reference
XF: X ray fluorescence.

The syntheses of Examples 1 to 4, carried out at 180° C. with the prior art template, without seeds, produced pure ZSM-23 zeolite (100% crystallinity ±3) with a varying Si/Al ratio of more than 18, with a maximum yield (about 5%). Example 2 corresponded to a preparation with seeds and necessitated a shorter crystallisation time compared with Example 1 to produce the MTT zeolite (8.2 days as opposed to 10.1 days). Example 4 produced mainly ZSM-23 zeolite with a little quartz since the crystallisation period was too long compared with Example 1 (11.8 days as opposed to 10.1 days).

EXAMPLES 5 to 8 (invention)

Synthesis of ZSM-23 zeolite with a variable Si/Al ratio of more than 18 with precursors of octamethonium bromide (1,8-hexamethyloctamethylenediammonium bromide) as the organic template containing a monoamine (trimethylamine).

The synthesis mixture had the following molar composition:

| Example | 5<br>Si/Al = 20 | 6<br>Si/Al = 20 | 7<br>Si/Al = 20 | 8<br>Si/Al = 100 |
|---|---|---|---|---|
| $SiO_2$ (mol) | 60 | 60 | 60 | 60 |
| $Al_2O_3$ (mol) | 1.5 | 1.5 | 1.5 | 0.3 |
| $Na_2O$ (mol) | 9 | 9 | 9 | 5 |
| DBrO (mol) | 10 | 10 | 10 | 10 |
| TMA (mol) | 20 | 20 | 20 | 20 |
| $H_2O$ (mol) | 3000 | 3000 | 3000 | 3000 |
| ZSM-23/$SiO_2$ (g/g) | 0 | 0.04 | 0 | 0 |

DBrO = dibromooctane
TMA = trimethylamine

The preparation was as described in Examples 1 to 4, but included mixing the two starting precursors, the aqueous solution of trimethylamine (Acros, 45%) and dibromooctane (Acros, 98%) in the 80% of water necessary to form the gel.

The results of X ray diffraction and chemical analysis of the solids recovered are shown in following table, along with the crystallisation conditions.

| Example | 5<br>Si/Al = 20 | 6<br>Si/Al = 20 | 7<br>Si/Al = 20 | 8<br>Si/Al = 100 |
|---|---|---|---|---|
| Temperature (° C.) | 180 | 180 | 180 | 180 |
| Time (days) | 9.4 | 7.9 | 11.2 | 7.2 |
| ZSM-23 (%, XRD) | 99 | 101 | 80 (+ 20% Q) | 100 |
| Si/Al (mol/mol, XF) | 18.9 | 17.8 | nd | 95 |
| Yield (%) | 4.7 | 4.9 | 4.6 | 4.9 |

Q: quartz
XRD: X ray diffraction with Example 1 as reference
XF: X ray fluorescence.

The syntheses of Examples 5 to 8, carried out at 180° C. with specific precursors of the template of the invention, without seeds, produced pure MTT zeolite (100% crystallinity ±3) with a varying Si/Al ratio of more than 18, with a maximum yield (about 5%). Example 6 corresponded to a preparation with seeds and necessitated a shorter crystallisation time compared with Example 5 to produce the ZSM-23 zeolite (7.9 days as opposed to 9.4 days). Example 7 produced mainly MTT zeolite with a little quartz since the crystallisation period was longer compared with Example 5 (11.2 days as opposed to 9.4 days).

EXAMPLES 9 and 10 (comparative)

Synthesis of ZSM-23 zeolite with a variable Si/Al ratio of more than 18 with dodecamethonium bromide (1,12-hexamethyldodecamethylenediammonium bromide) as the organic template.

The synthesis mixture had the following molar composition:

| Example | 9<br>Si/Al = 20 | 10<br>Si/Al = 100 |
|---|---|---|
| $SiO_2$ (mol) | 60 | 60 |
| $Al_2O_3$ (mol) | 1.5 | 0.3 |
| $Na_2O$ (mol) | 9 | 5 |
| $DodecaBr_2$ (mol) | 10 | 10 |
| $H_2O$ (mol) | 3000 | 3000 |

$DodecaBr_2$ = dodecamethonium bromide = $Me_3N(CH_2)_{12}NMe_3^{2+}(Br^-)_2$

A solution A composed of silica and template was prepared by diluting the dodecamethonium bromide in 80% of the water necessary to form the gel then adding the colloidal silica sol (Ludox HS40, Dupont, 40% $SiO_2$). Solid sodium hydroxide (Prolabo, 99%) and solid sodium aluminate (Prolabo, 46% $Al_2O_3$, 33% $Na_2O$) were then dissolved in 10% of the water necessary to form the gel to form a solution B. Solution B was added to solution A with stirring, then the remaining water (10%). Mixing was carried out until the medium was homogeneous and seeds of dried MTT zeolite were added. The resulting mixture was reacted in a 125 ml autoclave with stirring at 180° C. under autogenous pressure until the zeolite crystallised. After cooling, the product was filtered and washed with 0.5 liters of demineralised water then dried in a ventilated oven at 120° C.

The results of X ray diffraction and chemical analysis are shown in following table, as a function of the crystallisation conditions.

| Example | 9<br>Si/Al = 20 | 10<br>Si/Al = 100 |
|---|---|---|
| Temperature (° C.) | 180 | 180 |
| Time (days) | 11.2 | 8.5 |
| ZSM-23 (%, XRD) | 98 | 99 |
| Si/Al (mol/mol, XF) | 17.6 | 96 |
| Yield (%) | 4.7 | 4.9 |

XRD: X ray diffraction with Example 1 as reference
XF: X ray fluorescence.

The syntheses of Examples 9 and 10, carried out at 180° C. with the prior art template, without seeds, produced pure MTT zeolite (100% crystallinity ±3) with a varying Si/Al ratio of more than 18, with a maximum yield (about 5%).

EXAMPLES 11 and 12 (in accordance with the invention)

Synthesis of ZSM-23 zeolite with a variable Si/Al ratio of more than 18 with precursors of dodecamethonium bromide (1,12-hexamethyldodecamethylenediammonium bromide) as the organic template containing a monoamine (trimethylamine).

The synthesis mixture had the following molar composition:

| Example | 11<br>Si/Al = 20 | 12<br>Si/Al = 100 |
|---|---|---|
| $SiO_2$ (mol) | 60 | 60 |
| $Al_2O_3$ (mol) | 1.5 | 0.3 |
| $Na_2O$ (mol) | 9 | 5 |
| DBrD (mol) | 10 | 10 |
| TMA (mol) | 20 | 20 |
| $H_2O$ (mol) | 3000 | 3000 |

DBrD = dibromododecane
TMA = trimethylamine

The preparation was as described in Examples 9 and 10, but included mixing the two starting precursors, the aqueous solution of trimethylamine (Acros, 45%) and dibromododecane (Acros, 98%) in the 80% of water necessary to form the gel.

The results of X ray diffraction and chemical analysis are shown in following table, along with the crystallisation conditions.

| Example | 11<br>Si/Al = 20 | 12<br>Si/Al = 100 |
|---|---|---|
| Temperature (° C.) | 180 | 180 |
| Time (days) | 9.8 | 7.4 |
| ZSM-23 (%, XRD) | 101 | 103 |
| Si/Al (mol/mol, XF) | 17.6 | 17.8 |
| Yield (%) | 4.9 | 4.7 |

XRD: X ray diffraction with Example 1 as reference
XF: X ray fluorescence.

The syntheses of Examples 11 and 12, carried out at 180° C. with specific precursors of the template of the invention, with seeds, produced pure MTT zeolite (100% crystallinity ±3) with a varying Si/Al ratio of more than 18, with a maximum yield (about 5%).

Summary of ZSM-23 Syntheses

The data given in the above tables show that the MTT zeolites synthesised using specific organic template precursors containing a monoamine were crystallised in a shorter time than the ZSM-23 zeolites synthesised by a prior art method, which produced a cost advantage. Further, adding zeolite seeds during preparation further improved the performance as regards crystallisation time.

Complementary Examples

EXAMPLE 13

Preparation of ZSM-23 with Structure Type MTT

ZSM-23 zeolite was prepared in accordance with Example 6. The synthesised solid was calcined in dry air for 12 h at 550° C., then three successive ion exchange steps were carried out using an ammonium nitrate solution to obtain the $NH_4+$ form of the zeolite.

To this end 10 grams of the ZSM-23 zeolite from Example 6 was suspended in 100 ml of a solution of ammonium nitrate (5 M) then stirred under reflux for 2 hours. The solid was then filtered and washed. This circle of treatment was repeated two more times. The solid obtained was dried at 60° C. for 10 hours.

After treatment, the Si/Al ratio of the ZSM-23 zeolite was 18.3 with an Na content of the order of 23 ppm by weight.

EXAMPLE 14

Preparation of Catalyst C1 (in accordance with the invention)

The zeolite prepared in Example 9 was mixed with an alumina gel. The mixed paste was extruded through a 1.4 mm diameter die. The amount of ZSM-23 zeolite with structure type MTT in the support (zeolite+matrix) was 70% by weight.

Platinum was deposited using a solution of a platinum salt, $H_2PtCl_6$, to obtain a platinum content of 0.4% by weight on the support. The catalyst obtained was termed C1. The dispersion of the platinum, measured by $H_2/O_2$ titration after calcining at 450° C. in dry air and reduction in hydrogen at 420° C., was about 87%.

EXAMPLE 15

Catalytic Evaluation of Catalyst C1 in Hydroisomerisation of n-Heptane.

Prior to its catalytic evaluation, catalyst C1 was calcined at 450° C. in dry air for 4 hours.

The temperature rise was carried out at a rate of 5° C./minute with two constant temperature stages lasting one hour at 150° C. and 300° C.

The metallic phase was reduced in situ in the catalytic reactor just before the catalytic test was carried out.

The reduction conditions for the three catalysts were as follows:
- temperature rise at 7° C./minute up to 150° C. in a stream of hydrogen, constant temperature stage of 30 minutes;
- then raising the temperature, again at 7° C./minute, up to 300° C. in a stream of hydrogen, constant temperature stage of 30 minutes;
- finally, raising the temperature at 7° C./minute up to 450° C. in a stream of hydrogen, constant temperature stage of 60 minutes.

The temperature was then reduced to the reaction temperature, namely 230° C. The catalytic tests were carried out in a fixed bed reactor in the gas phase. The molecule isomerised (hydroisomerised) in the presence of hydrogen was n-heptane (99.9% pure) and the mole ratio used in the various catalytic tests of the hydrogen to the n-heptane was 2. The space velocity, i.e., the mass of n-heptane injected per gram of catalyst per hour, was 1.2 $h^{-1}$.

The produced formed were $C_1$ to $C_6$ cracking products or products containing 7 carbon atoms per molecule, or aromatic products from n-heptane aromatisation reactions.

The catalytic results obtained are shown in the following table:

| % by weight | Catalyst C1 containing ZSM-23 zeolite, in accordance with the invention |
|---|---|
| n-$C_7$ conversion | 88 |
| Yield of $C_1$–$C_6$ cracking products | 22 |
| Isomerisation yield | 66 |

This table shows that using a catalyst comprising ZSM-23 zeolite of the invention (catalyst C1) can effect n-heptane hydroisomerisation.

What is claimed is:

1. A process for synthesising a zeolite material with structure type MTT comprising at least one element X selected from silicon and germanium and at least one element T selected from aluminium, iron, gallium, boron, titanium, vanadium, zirconium, molybdenum, arsenic, antimony, chromium and manganese, comprising mixing, in an aqueous reaction mixture, at least one source of at least one element X, at least one source of at least one element T, at least one precursor of a template comprising an alkylated polymethylene α-ω diammonium derivative selected from monoamines, and at least one other alkylated polymethylene α-ω diammonium derivative precursor selected from alkane dihalides and alkanediols.

2. A process according to claim 1, wherein said alkylated α-ω diammonium polymethylene derivative has the following formula: $R_1R_2R_3N^+ (CH_2)_n N^+ R_4R_5R_6$, where n is in the range 3 to 14 and $R_1$ to $R_6$, which may be identical or different, represent alkyl or hydroxyalkyl radicals containing 1 to 8 carbon atoms, and up to five $R_1$ to $R_6$ radicals can be hydrogen.

3. A process according to claim 1, in which the alkylated α-ω diammonium polymethylene derivative comprises an alkylated derivative of heptamethylenediammonium, octamethylenediammonium, undecamethylenediammuonium or dodecamethylenediammonium.

4. A process according to claim 1, in which the alkylated α-ω diammonium polymethylene derivative is selected from 1,7-N,N,N,N',N', N',-hexamethylheptamethylene- diammonium salts, 1,8-N,N,N,N',N', N',-hexamethyloctamethylenediammonium salts, 1,11-N,N,N,N',N', N',-hexamethylundecamethylenediammonium salts and 1,12-N,N,N,N',N', N',-hexamethyldodecamethylenediammonium salts.

5. A process according to claim 1 in which the alkylated α-ω diammonium polymethylene derivative precursor selected from monoamines is a trialkylamine.

6. A process according to claim 1, wherein said at least one alkylated α-ω diammonium polymethylene derivative precursor selected from monoamines is trimethylamine.

7. A process according to claim 1, in which the precursor is selected from dibromoheptane, dibromooctane, dibromoundecane and dibromododecane.

8. A process according to claim 1, in which at least one seed of at least one zeolite is added to the reaction mixture.

9. A process according to claims 1, in which at least one salt P is added to the mixture.

10. A process according to claim 9, wherein salt P is at least one alkali metal or ammonium salt.

11. A process according to claim 1, in which the reaction mixture has the following molar composition, expressed in the oxide form:

| | |
|---|---|
| $XO_2/T_2O_3$ (mol/mol) | at least 10 |
| $Q/XO_2$ (mol/mol) | 0.002 to 2.0 |
| $OH/XO_2$ (mol/mol) | 0.002 to 2.0 |
| $Q/(M^+ + Q)$ (mol/mol) | 0.1 to 1 |
| $H_2O/XO_2$ (mol/mol) | 1 to 500 |
| $P/XO_2$ (mol/mol) | 0 to 5 |
| $S/XO_2$ (g/g) | 0 to 0.1 | where $M^+$ represents an alkali metal or an ammonium ion and Q represents the alkylated polymethylene α-ω diammonium derivative, introduced by means of precursors comprising a monoamine.

12. A process according to claim 11, in which the reaction mixture has the following molar composition, expressed in the oxide form:

| | |
|---|---|
| $XO_2/T_2O_3$ (mol/mol) | at least 12 |
| $OH^-/XO_2$ (mol/mol) | 0.005 to 1.5 |
| $Q/XO_2$ (mol/mol) | 0.005 to 1.5 |
| $Q/(M^+ + Q)$ (mol/mol) | 0.1 to 1.0 |
| $H_2O/XO_2$ (mol/mol) | 3 to 250 |
| $P/XO_2$ (mol/mol) | 0 to 1 |
| $S/XO_2$ (g/g) | 0 to 0.07. |

13. A process according to claim 11, in which the reaction mixture has the following molar composition, expressed in the oxide form:

| | |
|---|---|
| $XO_2/T_2O_3$ (mol/mol) | at least 15 |
| $OH^-/XO_2$ (mol/mol) | 0.01 to 1 |
| $Q/XO_2$ (mol/mol) | 0.01 to 1 |
| $Q/(M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0 to 0.04. |

14. A process according to claim 1, in which X is silicon and T is aluminium.

15. A process according to claim 1, in which the alkylated polymethylene α-ω diammonium derivative precursors are introduced at any time during the synthesis.

16. A process according to claim 1, in which the precursors are introduced in solution before adding element T and element X.

17. A process according to claim 1, wherein the template precursors are introduced into the reaction mixture before adding the other reactants.

18. A process according to claim 1, wherein said monamines are alkylamines having 1 to 18 carbon atoms.

19. A process according to claim 1, wherein the reaction mixture is react under autogenous pressure, optionally with addition of a gas, at a temperature in the range 85° C. to 250° C. until zeolite crystals form.

20. A process utilizing a zeolite with structure type MTT prepared according to claim 1 as an adsorbent for controlling pollution, or as a molecular sieve for separation.

21. A process for hydroisomerising paraffins containing 6 to 10 carbon atoms per molecule in the presence of a catalyst prepared according to claim 1, said process being carried out at a temperature in the range 150° C. to 350° C., at a partial pressure of hydrogen in the range 0.1 to 7 MPa, at a space velocity in the range 0.2 to 10 liters of liquid hydrocarbons per liter of catalyst per hour, and with a hydrogen/feed mole ratio at the reactor inlet such that the hydrogen/feed mole ratio in the effluent leaving the reactor is generally more than 0.01.

* * * * *

UNITED STATES PATENT AND TRADEMARK OFFICE
CERTIFICATE OF CORRECTION

PATENT NO. : 6,548,040 B1
DATED : April 15, 2003
INVENTOR(S) : Rouleau et al.

It is certified that error appears in the above-identified patent and that said Letters Patent is hereby corrected as shown below:

<u>Column 11,</u>
Line 63, delete "undecamethylenediammuo-nium"
and insert -- undecamethylenediammonium --.

<u>Column 12,</u>
Line 5, after "claim 1" insert -- , --.

Signed and Sealed this

Eighth Day of June, 2004

JON W. DUDAS
*Acting Director of the United States Patent and Trademark Office*